April 16, 1968     H. GERMANN     3,377,892

CHAIN PLIERS FOR TUBES

Filed Feb. 28, 1967

United States Patent Office 3,377,892
Patented Apr. 16, 1968

3,377,892
CHAIN PLIERS FOR TUBES
Hans Germann, 13 Isabellenstrasse,
2500 Bienne, Switzerland
Filed Feb. 28, 1967, Ser. No. 619,384
1 Claim. (Cl. 81—65)

ABSTRACT OF THE DISCLOSURE

Chain pliers for tubes which can be handled with one hand, the chain being adjustable in length.

---

The present invention is concerned with chain pliers for tubes which can be used in very narrow spaces and handled with one hand.

In the pipe fitting art, it is often required to bend pipes or the points of pipes which are located in narrow spaces. It is often desired that such operation be performed by means of a tool which can be handled with one hand so as to leave the other hand free for other tasks. Suitably such tools should be able to grasp the pipe from the right or from the left and should be operable with either the right hand or the left hand. Similarly the tool should not exert such a pressure as would deform the tube.

The main object of the present invention is to provide a tool which will respond to the above mentioned needs.

Another object of the invention is to provide chain pliers for tubes which will have coarse and fine adjustment means for determining selective pressures on a tube to be grasped.

Another object of the invention is to provide a device of the type described, wherein the chain of the pliers is secured adjustably on a connecting piece pivotally mounted on one of the tongue arms of the pliers.

Figure 1:
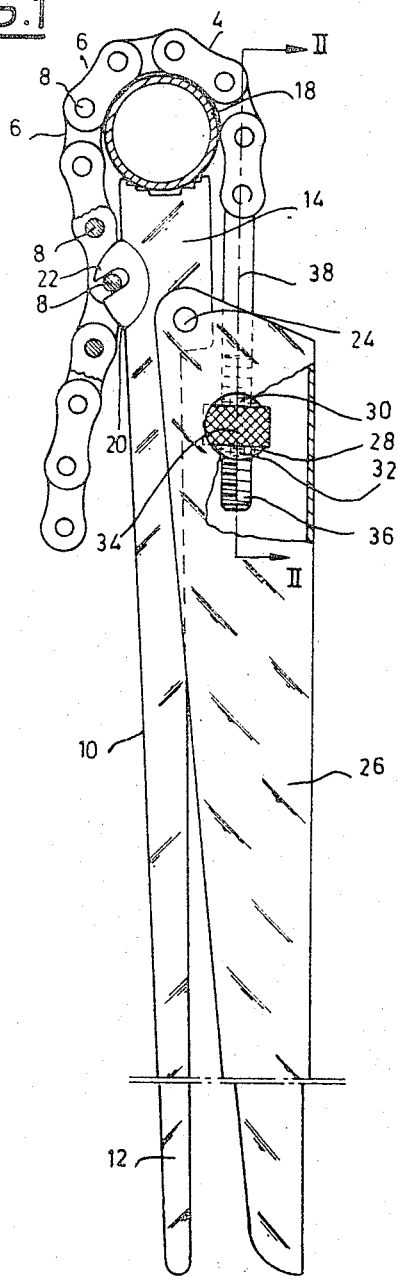
Figure 2:
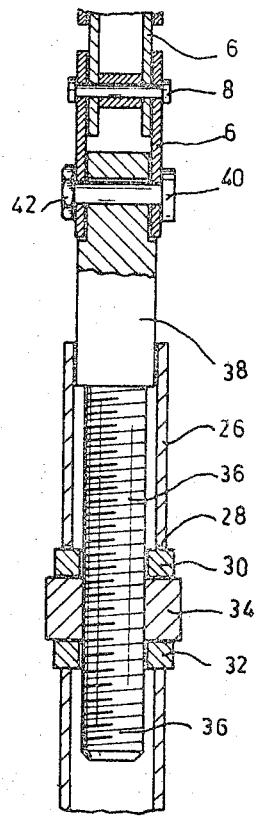

These and other related objects, features, and advantages of the present invention will be more readily understood from the following detailed description thereof, particularly when taken together with the accompanying drawings wherein:

FIGURE 1 is a front elevational view, partly broken away, of one embodiment of the invention, and FIGURE 2 is a view taken from below and showing the details of the adjustment means for the chain.

Referring now to FIGURE 1, the chain pliers according to the invention consist of the pliers body generally designated by 2, and which suitably can be made of aluminum alloy or other suitable metal. The chain 4, suitably of stainless steel, comprises links 6 secured by rivets or studs 8.

The pliers comprise a first tongue arm 10 terminating in a handle at its lower end 12, which if desired can be curved for easier grasping. At its upper end, this arm terminates in a grasping head 14 provided with serrations to enable it to firmly grasp a pipe 18 in conjunction with chain 4. Immediately below grasping head 14, the arm is reduced on both sides thereof to form a beak-shaped catch member 20 having therein notch 22 of a size such as to accommodate therein stud 8 of the chain.

Pivoted to first tongue arm 10 on pivot 24 is a second tongue arm 26 having side walls so spaced apart as to allow pivot arm 10 to fit therein. In its upper part arm 26 has opening 28 in which fits hemispherical screws 30 and 32 on both sides of adjustment nut 34 and, like, 34 threaded on threaded member 36. As shown threaded member 36 is the lower part of connecting member 38 which is secured at its upper extremity to chain 4 by means of a screw and a nut 40, 42. The assembly consisting of screws 30, 32 and adjustment nut 34 is able to rotate for a portion of a turn in opening 28 of arm 26. As shown it is possible to operate the adjustment nut 34 from both sides of the pliers, since it protrudes on both sides thereof.

In operation the chain 4 is passed over the tube or pipe 18 and a coarse adjustment is made by placing one of the pins or studs of the chain 8 in notch 22 of catch 20. To obtain a final, finer adjustment, an adjustment nut 34 is then tightened as desired. To extract the pliers from engagement after use, the adjusting nut is then loosened and it becomes an easy matter to remove the chain from the catch.

The present device is very flexible since it has several pivoting points. Thus the two tongue arms are pivoted on one another, the connecting member 38 is pivotable with respect to arm 26 and the chain is also pivotable with respect to the connecting arm.

It is seen that the present device because of its compact nature can be used in very narrow spaces. Because of its construction it can be used to grasp pipes on the left or from the right. Because of the secure grasp it gives it avoids deforming the tubes.

Naturally the pliers can be made to accommodate all sizes of tubes and in particular those ranging from ⅜ of an inch to 2 inches in outside diameter.

While the present invention has been described with respect to one preferred embodiment thereof, it will be understood that the same is not in any way limited thereto and that there may be made various changes in the shape and form of its constituent parts without thereby departing from its spirit and scope, except as set forth in the accompanying claim.

What is claimed is:

1. Chain pliers for tubes comprising in combination a first tongue arm having at one end thereof tube grasping means and chain securing means consisting of a beak-shaped catch having a downwradly directed notch; a second tongue arm pivoted on said first arm, a connecting member pivotably secured to said second arm, a chain pivotably secured to said connecting member and adapted to engage said notch of said chain securing means to thereby clamp a tube against said tube grasping means of said first tongue arm, and means for adjusting the length of said connecting member and thereby the length of said chain, said second tongue arm having an internal cavity thicker than said first arm, said first arm fitting therein; said connecting member being pivotably secured to said chain at its upper end and being threaded at its lower end; said second tongue arm having a rounded opening in the upper end thereof and said connecting member being rotatably mounted in said opening by means of hemispherical screws, and an adjustable nut screwed on said threaded member and rotatably fitting in said opening.

References Cited

UNITED STATES PATENTS 1,824,944   9/1931   Carnelli _____ 81—65

FOREIGN PATENTS 443,730   5/1927   Germany.
310,914   1/1956   Switzerland.

JAMES L. JONES, Jr., *Primary Examiner.*